May 20, 1941.  C. D. KOSKI  2,242,915
RESILIENT WHEEL
Filed April 15, 1937
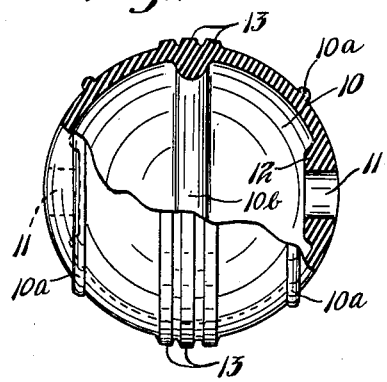
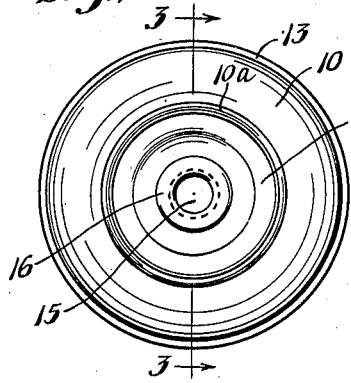
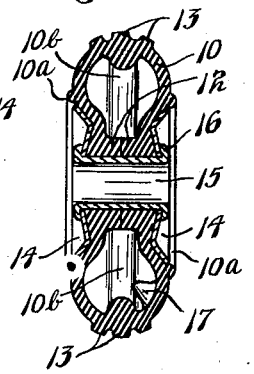
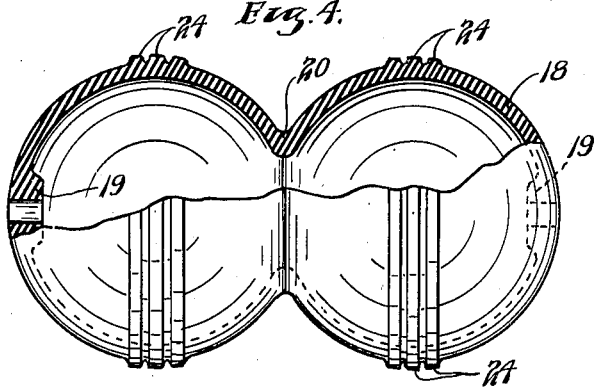
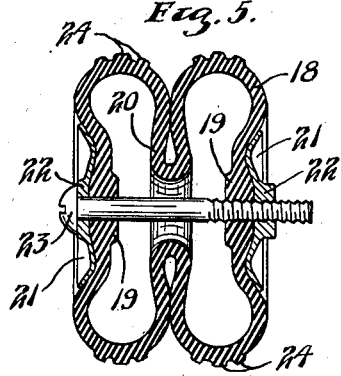
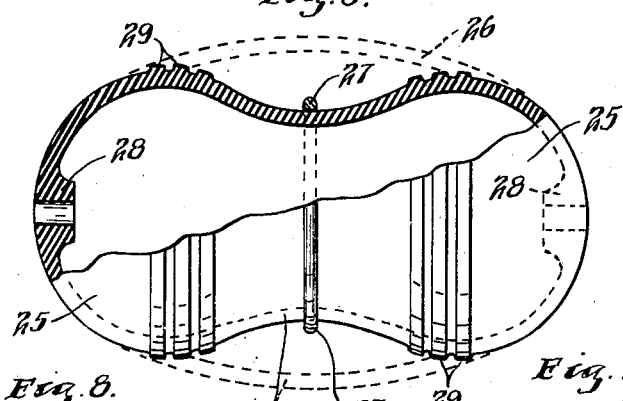
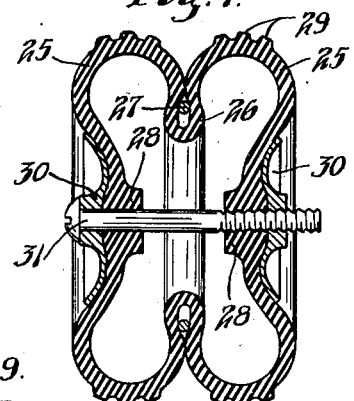
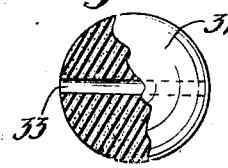
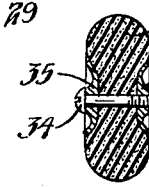
INVENTOR.
CARLO D. KOSKI.
BY HIS ATTORNEYS
Williamson & Williamson Patented May 20, 1941

2,242,915

UNITED STATES PATENT OFFICE 2,242,915

RESILIENT WHEEL

Carlo D. Koski, Minneapolis, Minn., assignor of one-half to John A. Kaneski, Minneapolis, Minn.

Application April 15, 1937, Serial No. 137,018

4 Claims. (Cl. 152—7)

This invention relates to a tire equipped wheel structure which is particularly adaptable for use on small toys and on children's vehicles such as coaster wagons and the like, but is a structure which it is conceived may also be adapted for use on large vehicles of any type.

In one form of the invention I have found that I can produce a structure of this kind which will have generally the appearance of a standard wheel with a tire by taking a resilient element having a surface of revolution and compressing it from opposite points on the axis of said surface of revolution and then retaining the element in its compressed condition by some sort of securing means so that the finished article has the appearance of the ordinary single vehicle wheel and tire. In other forms of the invention I can produce a tired wheel construction which has the appearance of a dual wheel such as is used on the rear wheels of the heavier trucks and buses.

It is an object of my invention to provide a structure of this type which may be quickly and easily formed from a relatively simple resilient element at much less cost than that of molding the object in its finished shape.

It is a further object to provide a structure having the appearance of an ordinary tire equipped wheel which may be formed from a hollow element or a relatively solid compressible element having at least one surface of revolution. A further object is to provide a structure of the general type described which may be inflated without the use of an inner tube, or which may be used without inflation, the material from which the tire element is formed having sufficient rigidity to support itself and the vehicle to which it is applied.

A still further object is to produce a tire equipped wheel structure from compressible resilient elements which may have nearly any conceivable shape within certain reasonable limits just so long as the element has at least one surface of revolution.

These and other objects and advantages of the invention will be more fully set forth in the following description made in connection with the accompanying drawing, wherein like reference characters refer to the same or similar parts throughout the several views, and in which:

Fig. 1 is a partially broken away side elevation of one form of element used in carrying out my invention;

Fig. 2 is a side elevation of the finished wheel structure in one embodiment of the invention;

Fig. 3 is a section taken on the line 3—3 of Fig. 2;

Fig. 4 is a partially broken away side elevation of a different type of compressible element;

Fig. 5 is a vertical section through one of the completed wheel structures made with the element shown in Fig. 4;

Fig. 6 is illustrative of a still different type of compressible element;

Fig. 7 is a wheel structure formed from the element shown in Fig. 6;

Fig. 8 is a reduced view of a relatively solid compressible element, and

Fig. 9 is a vertical section taken through a wheel structure made with one of said relatively solid compressible elements.

Referring to the drawing in more detail, there is shown in Fig. 1 a ball-like structure 10 which is preferably made of a relatively high grade of rubber. In this particular form I have shown the compressible element as being hollow with openings 11 extending through the built up inner shoulder portions 12. The treadlike portions 13 which are shown have rings around the ball with their centers coinciding with the axes of the openings 11. The compressible element 10 is shown in Fig. 1 to be a substantially true sphere. This particular shape is especially adaptable for making a single wheel structure as shown in Figs. 2 and 3, but it is not necessary that the compressible element 10 be substantially spherical. The only requirement is that the element have at least one surface of revolution and, of course, it would be necessary for the surface of revolution to lie at right angles to the openings 11 so that the circumference of the finished product will be circular.

When an element such as the element 10 has been compressed inwardly from opposite points along the axis of its surface of revolution, the element will take the shape shown in Fig. 3. In the particular embodiment shown, the shoulders 12 on the inside of the element are in abutment. In Figs. 2 and 3 there is shown a pair of circular apertured plates 14 which are shown in Fig. 3 to be irregularly shaped so that when they are pressed tightly against the sides of the compressed element 10, the portions of the compressed element adapted to provide the side walls and beads of the tire structure will be held in the cross sectional shape of the standard vehicle tire. A sleeve 15 is then inserted through the openings in the plate 14 and the openings 11 in the compressed element and the ends of the sleeve 15 bent over as at 16 to rigidly secure the entire structure together.

When an element of this type is compressed inwardly certain portions thereof will be placed under compressive stress and other portions under tension. By so distorting the element and placing it under these stresses its ability to stand up under applied loads is considerably increased.

Compression of the element 10 to a point where the inner shoulders 12 are in abutment will cause substantial sealing of the interior of the compressible element 10, and I have provided a rubber sealing element 17 in a portion of the compressed element 10 so that air may be introduced under pressure as with a hollow needle element inserted through the mass of rubber 17 to the interior of the element 10, withdrawal of the needle after inflation of the interior of the tire element resulting in sealing of the opening made by the needle because of pressure upon said sealing mass 17.

Fig. 4 illustrates a compressible element 18 which is used for building up a dual wheel structure. The principal requirement for the shape of this type of compressible element is that it have at least two surfaces of revolution and, of course, these surfaces must be parallel to each other to provide a dual wheel arrangement. The element is embodied with oppositely disposed interior projections 19 similar to the projections 12 shown in Figs. 1 and 3. In this case, as illustrated in Fig. 5, when the element 18 is compressed, the shoulders 19 are not necessarily brought into abutting relation as in the case of the structure in Fig. 3. It will be seen that when the element 18 is compressed along the axis of its surfaces of rotation the reduced central area 20 will cause the adjacent surfaces of the element to come together as shown in Fig. 5 and since the end portions of the element have been pressed toward each other, the element will assume the tire shape shown in vertical section in Fig. 5. A pair of plates 21 similar in shape to the plates 14 in the first embodiment are placed against the side walls of the tire structure. It will be noted, however, that these plates 21 have relatively heavy hub portions 22. These are provided with openings and a bolt 23 is slipped through the left-hand plate 21 and threaded through the opening in the right-hand plate 21. Of course the bolt 23 is used only in a smaller construction and if a wheel structure of this type is to be used for larger vehicles, some other means than the bolt 23 would probably be substituted therefor. The tread elements 24 are shown around the surfaces of revolution of the compressible element 18 and the wheel structure is shown in Fig. 5. These tread elements may be any shape or design such as the non-skid tread surfaces of a standard automobile tire. It is immaterial, however, whether such elements are provided or not.

In the embodiment shown in Figs. 6 and 7 it will be seen that the compressible element 25 has an original shape indicated by the dotted lines 26. It is then depressed around its center and held as by the ring 27, leaving two surfaces of revolution similar to those in the embodiment shown in Figs. 4 and 5. It is, of course, preferred that the element be provided with the shoulders 28 similar to the inner shoulders shown and described in the other embodiments and that it have suitably positioned tread elements 29. Compression of this particular element along the axis of its surfaces of revolution will produce a tire and wheel structure of an appearance substantially as shown in Fig. 7. The means for retaining this element in its compressed shape is shown to be plates 30 and a bolt 31 which are shaped and held together in the same manner as the elements in Fig. 5.

Fig. 8 shows a mass 32 of relatively solid but compressible material such as sponge rubber. It is preferably provided with a central opening 33 which is adapted to receive a retaining bolt 34 which in cooperation with the disc-like plates 35 retain the element in its compressed shape in the same manner as the elements in Figs. 5 and 7. Of course the retaining element in this case may be the same as shown in Fig. 3. Suitable tread elements may be formed on the compressible mass 32 as in the other embodiments and it is preferred that the small outer surface of the sponge rubber element be provided with a relatively tough skin or outer layer so that it will wear longer.

From the foregoing it will be seen that I have provided a very simple process for forming a tire equipped wheel structure and the finished article is one which can be assembled very quickly and easily and in its final form presents substantially the same appearance as a conventional wheel and tire construction for vehicles. On the other hand, it is contemplated that these various structures can be used in some instances without any inflation, the inherent strength of the compressible element being sufficient in some cases to support the weight of the vehicle to which it is secured. In the form shown in Fig. 3 it is suggested that any type of standard axle construction could be easily adapted to support the wheel with the use of any well known bearing structure if it is desired to provide an efficient anti-friction mounting. However, on small toy vehicles it is thought that the sleeve 15 will provide an effective bearing surface. In the embodiments set forth in Figs. 5 and 7, the threaded bolts 23 and 31 may be secured to a bearing element in any desired manner.

In Fig. 3 there is shown a bead 10a which extends around the finished tire just outside of the side plate 14. This bead is intended not only to improve the appearance of the device, but is used to strengthen the wall of the element. While it is shown in that one position, it is to be understood that a bead or beads may be placed at any desired point on the element. If a bead is formed nearer to the tread portion of the tire, either inside or outside, the tire wall will be reenforced at that point and will not bend so easily. This will give the appearance of a straight side tire and flat tread such as is in common use today.

The inner, larger bead or built up portion 10b in Fig. 3 is also used to strengthen the tire.

It will, of course, be understood that various changes may be made in the form, details and arrangement of parts of the apparatus and that the sequence of steps may be varied in my method, all within the scope of this invention.

What is claimed is:

1. A wheel structure or the like comprising a one piece resilient element having spaced ground engaging surfaces of revolution on a common axis, and oppositely positioned apertured portions on said axis pressed inwardly toward each other a distance substantially as great as half the length of said axis, and portions between said surfaces of revolution, said last mentioned portions forming adjacent side walls of a multiple wheel construction.

2. A wheel structure or the like comprising a one piece resilient element having spaced surfaces of revolution on a common axis, and oppositely positioned apertured portions on said axis pressed inwardly toward each other a considerable distance to produce a wheel shape, and portions between said surfaces of revolution, said last mentioned portions forming adjacent side walls of a multiple wheel construction, and means extending through said element for retaining said element in its inwardly pressed position.

3. A wheel structure or the like comprising a one piece resilient element having spaced surfaces of revolution on a common axis, and oppositely positioned apertured portions on said axis pressed inwardly toward each other, and portions between said surfaces of revolution, said last mentioned portions forming adjacent side walls of a multiple wheel construction, apertured discs positioned at the inwardly pressed portions of said element and shaped to cause said element to conform generally with the transverse sectional shape of a vehicle tire and wheel, and an axle member extending through said element and said discs.

4. A wheel structure or the like comprising a one piece resilient element having parallel surfaces of revolution of substantially equal diameter on a common axis and being apertured along said axis, said element being inwardly compressed against its normal resistance a considerable distance along said axis, and a ring-like member positioned between said parallel surfaces of revolution, said ring-like member being of less diameter than that of said parallel surfaces of revolution, whereby said element, when compressed, will provide a structure simulating a conventional vehicle tire and wheel, and means for retaining said element in its compressed shape.

CARLO D. KOSKI.